US 11,433,838 B2

(12) United States Patent
Thompson et al.

(10) Patent No.: US 11,433,838 B2
(45) Date of Patent: Sep. 6, 2022

(54) FRONT GUARD FOR WORKING VEHICLE

(71) Applicant: KUBOTA CORPORATION, Osaka (JP)

(72) Inventors: Zachary Thompson, Jefferson, GA (US); Carlos Cabrera, Jefferson, GA (US); Junta Kuwae, Osaka (JP); Taiki Furuki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 160 days.

(21) Appl. No.: 16/899,969

(22) Filed: Jun. 12, 2020

(65) Prior Publication Data
US 2021/0009059 A1    Jan. 14, 2021

(30) Foreign Application Priority Data
Jul. 12, 2019 (JP) .............................. JP2019-129802

(51) Int. Cl.
| | |
|---|---|
| *B60R 19/52* | (2006.01) |
| *B62D 49/00* | (2006.01) |
| *B62D 27/02* | (2006.01) |
| *B60R 19/38* | (2006.01) |
| *E02F 9/08* | (2006.01) |

(52) U.S. Cl.
CPC .............. *B60R 19/52* (2013.01); *B60R 19/38* (2013.01); *B62D 27/02* (2013.01); *B62D 49/00* (2013.01); *E02F 9/0858* (2013.01)

(58) Field of Classification Search
CPC ......... B60R 19/52; B60R 19/38; B62D 27/02; B62D 49/00; E02F 9/085; E02F 9/0858
USPC .......................................................... 293/115
See application file for complete search history.

(56) References Cited

U.S. PATENT DOCUMENTS 6,908,128 B2 *   6/2005   Strong .................... B60R 19/02
293/126

FOREIGN PATENT DOCUMENTS

| JP | 2007 186151 | | 7/2007 |
|---|---|---|---|
| JP | 2013018324 A | * | 1/2013 |

* cited by examiner

*Primary Examiner* — D Glenn Dayoan
*Assistant Examiner* — Dana D Ivey
(74) *Attorney, Agent, or Firm* — Greenblum & Bernstein, P.L.C.

(57) ABSTRACT

A front guard includes: a lower frame; and an upper frame and is configured to be swung to change a posture between a standing posture and a forward-leaning posture with respect to the lower frame. The lower frame has: a first lower member; and a second lower member. The upper frame has: a first stretching portion; a second stretching portion; and a connector portion. The connector portion has: a first portion; a second portion; and a middle portion. The first portion shifts forward as extending from the first stretching portion side to the middle portion side. The second portion shifts forward as extending from the second stretching portion side to the middle portion side. The middle portion extends in the vehicle width direction to connect the first portion and the second portion.

7 Claims, 9 Drawing Sheets

FRONT GUARD FOR WORKING VEHICLE

CROSS-REFERENCE TO RELATED APPLICATIONS

The present application claims priority under 35 U.S.C. § 119 to Japanese Patent Application No. P2019-129802, filed Jul. 12, 2019. The content of this application is incorporated herein by reference in their entirety.

BACKGROUND OF THE INVENTION

Field of the Invention

The present invention relates to a front guard for a working vehicle such as a tractor.

Description of Related Art

A front guard for a working vehicle disclosed in Japanese Patent Application Publication No. 2007-186151 is previously known.

The front guard for the working vehicle disclosed in Japanese Patent Application Publication No. 2007-186151 includes a vertical frame extending in the vertical direction and a lateral frame extending in the horizontal direction.

SUMMARY OF THE INVENTION

A front guard for a working vehicle, the front guard being configured to be attached to a front portion of a vehicle body of the working vehicle, includes: a lower frame to be attached to the vehicle body; and an upper frame attached to the lower frame swingably around an axis extending in a vehicle width direction to be arranged in front of a bonnet of the working vehicle, and configured to be swung to change a posture between a standing posture and a forward-leaning posture with respect to the lower frame. The lower frame has: a first lower member to be arranged to a first side in front of the vehicle body; and a second lower member to be arranged to a second side in front of the vehicle body. The upper frame has: a first stretching portion extending upward from the first side of the first lower member; a second stretching portion extending upward from the second side of the second lower member; and a connector portion connecting between an upper end of the first stretching portion and an upper end of the second stretching portion. The connector portion has: a first portion to be connected to the first stretching portion; a second portion to be connected to the second stretching portion; and a middle portion connecting the first portion and the second portion. The first portion shifts forward as extending from the first stretching portion side to the middle portion side. The second portion shifts forward as extending from the second stretching portion side to the middle portion side. The middle portion extends in the vehicle width direction to connect the first portion and the second portion.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
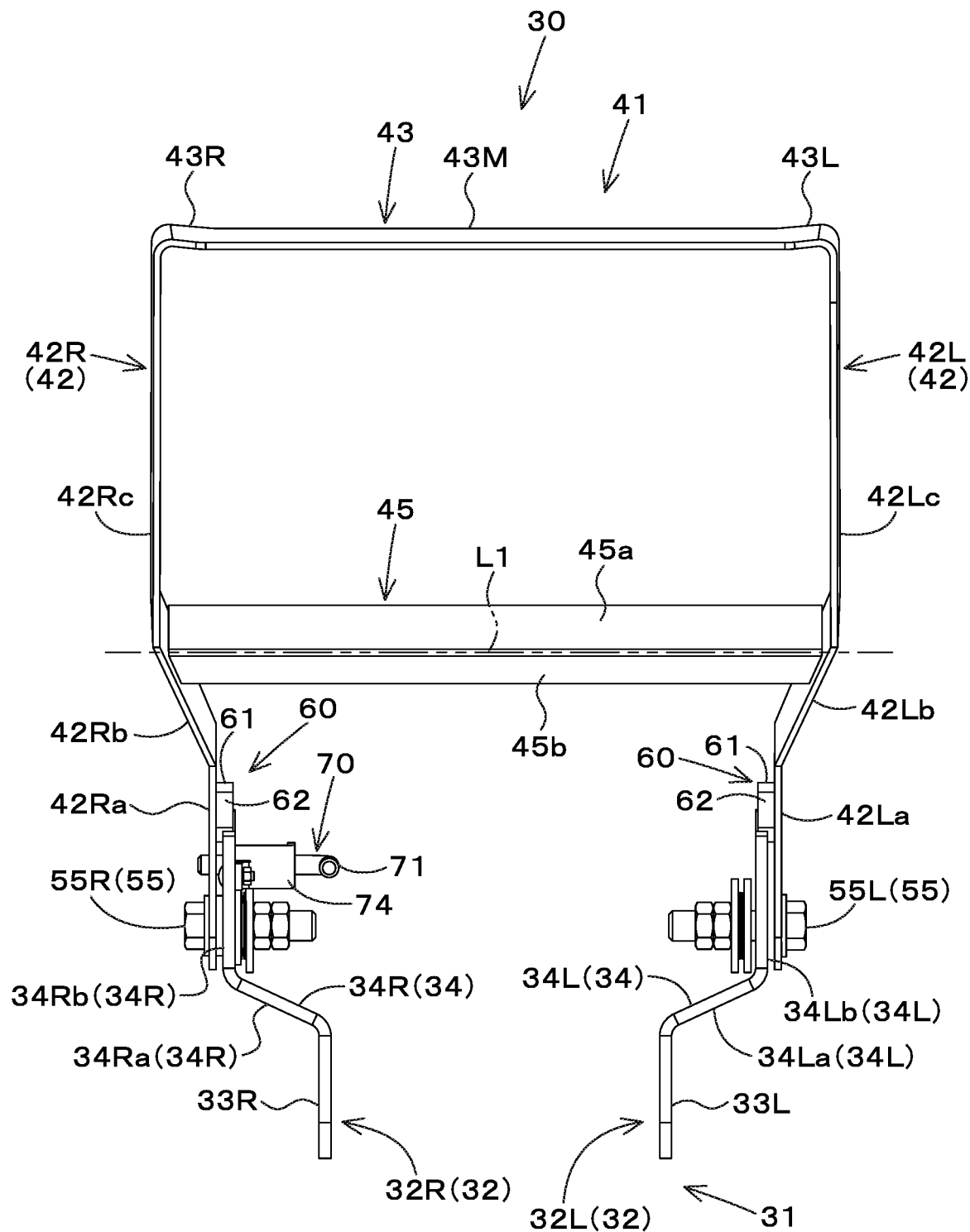
FIG. 1 is a front view of a front guard according to an embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings.

<Working Vehicle>

Figure 8:
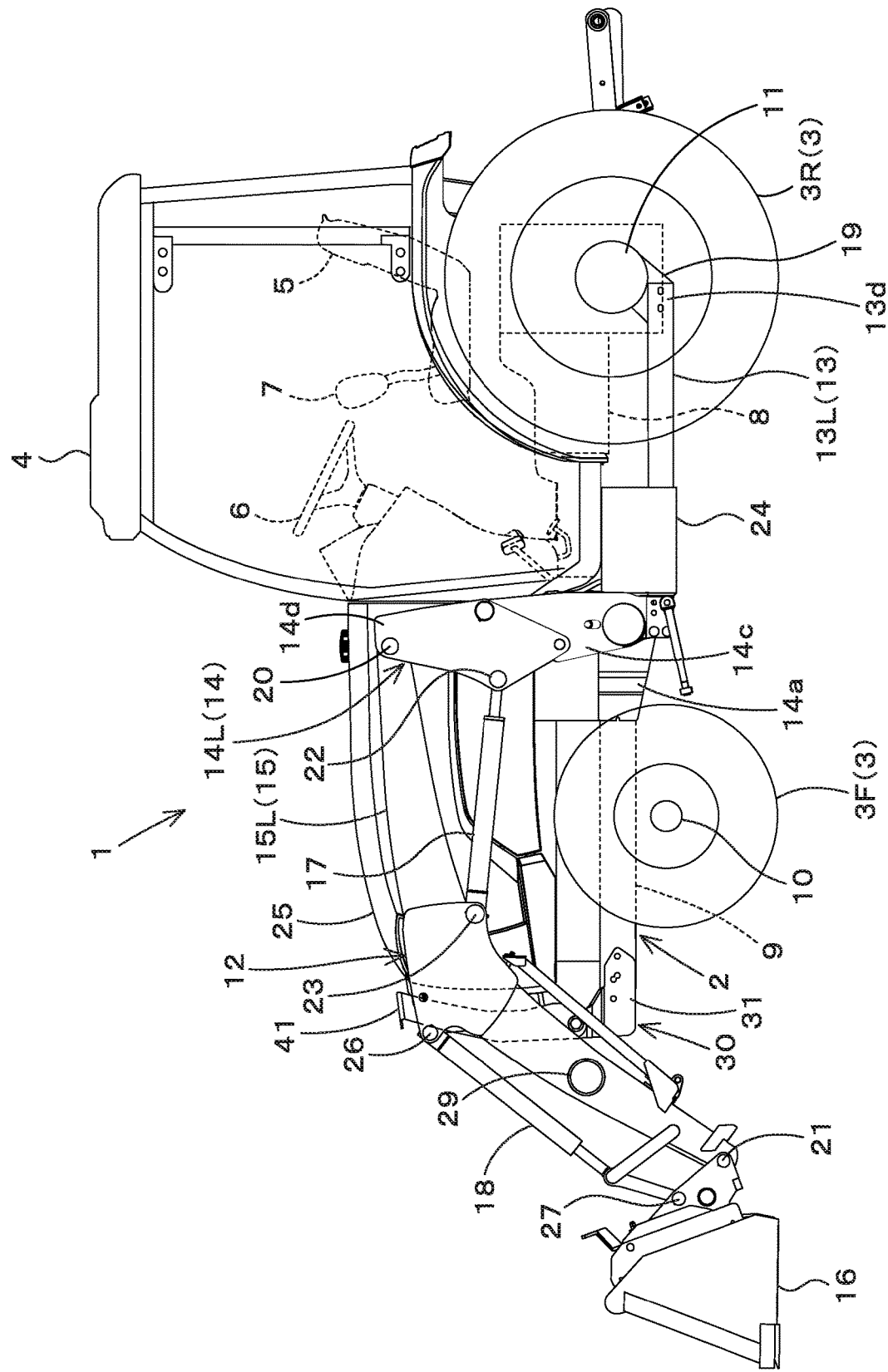
FIG. 8 is a side view of a working vehicle equipped with the front guard according to the embodiment.
Figure 9:
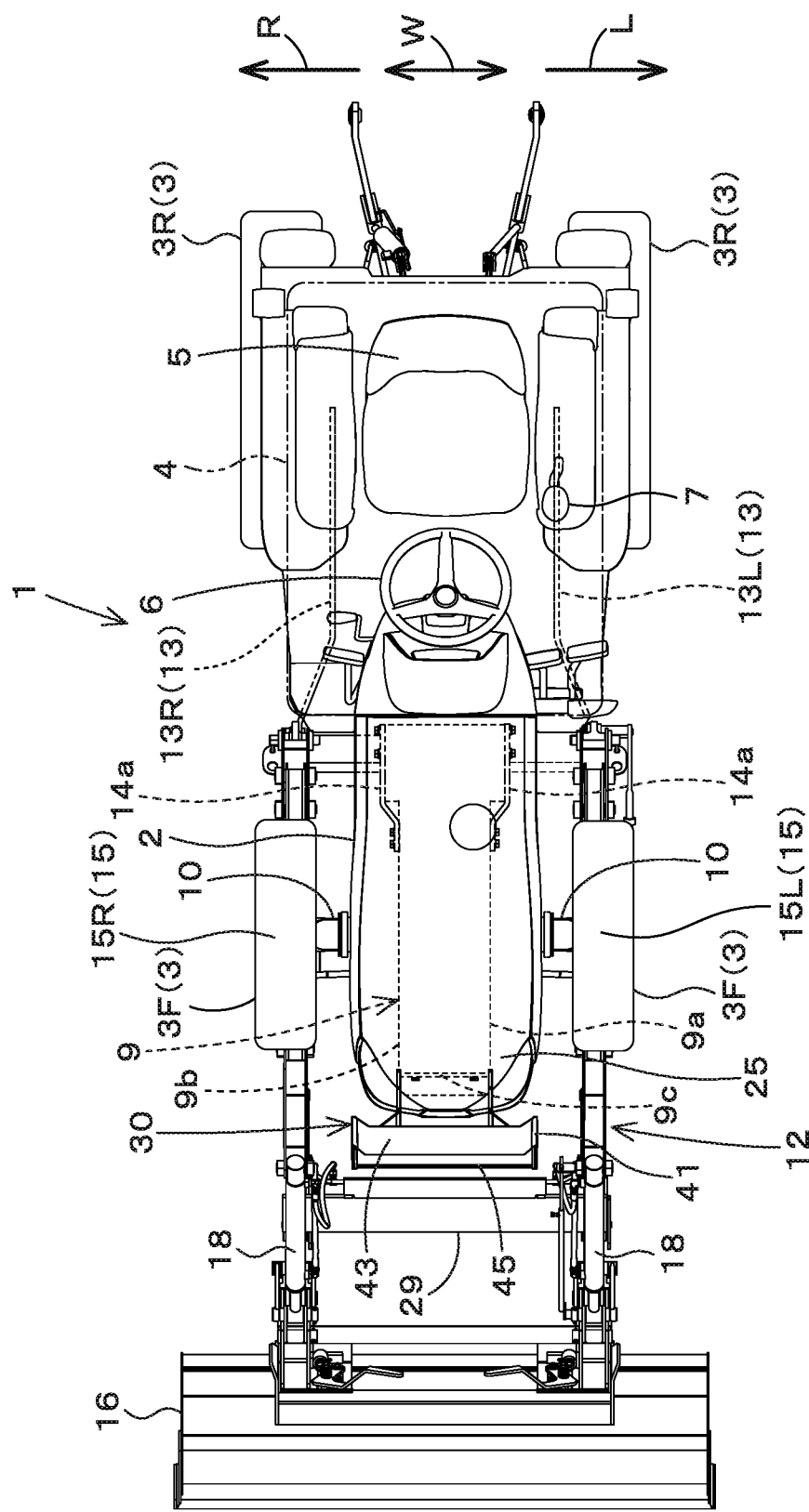
FIG. 9 is a plan view of the working vehicle equipped with the front guard according to the embodiment.

First, a working vehicle 1 to which a front guard according to the embodiment of the present invention is attached will be described below. FIG. 8 is a side view showing one embodiment of the working vehicle 1. FIG. 9 is a plan view showing one embodiment of the working vehicle 1.

In the present embodiment, the working vehicle 1 is a tractor. Hereinafter, the description will be made assuming that the working vehicle 1 is the tractor 1. However, the working vehicle 1 according to the present invention is not limited to the tractor, and may be another type of working vehicle.

In the following description, the front side of the operator sitting on an operator seat 5 of the tractor (the working vehicle) 1 (the left sides of FIG. 8 and FIG. 9) is referred to as the front, the rear side of the operator (the right sides of FIG. 8 and FIG. 9) is referred to as the rear, the left side of the operator (a direction indicated by an arrowed line L in FIG. 9) is referred to as the left, and the right side of the operator (a direction indicated by an arrowed line R in FIG. 9) is referred to as the right.

In addition, the horizontal direction (a direction indicated by an arrowed line W in FIG. 9), which is a direction orthogonal to the front-rear direction of the working vehicle 1, will be described as a vehicle width direction. In addition, a direction corresponding to the vehicle width direction and separating away from the center in the vehicle width direction will be described as a vehicle outward direction (a vehicle outward side), and a direction corresponding to the vehicle width direction and approaching the center in the vehicle width direction will be described as a vehicle inward direction (a vehicle inward side).

As shown in FIG. 8 and FIG. 9, the tractor 1 includes a vehicle body 2 and a traveling device 3.

A cabin 4 is mounted on the vehicle body 2. The operator seat 5 is provided inside the cabin 4. A steering wheel 6 is arranged in front of the operator seat 5. An operation lever 7 is arranged beside the operator seat 5. An engine (not shown in the drawings) is mounted on a front portion of the vehicle body 2, and an upper portion and a side portion of the engine are covered with a bonnet 25.

A clutch housing, a transmission case 8 and the like are provided to a rear portion of the vehicle body 2. The traveling device 3 includes a front wheel 3F provided at a front portion of the vehicle body 2 and includes a rear wheel 3R provided at a rear portion of the vehicle body 2.

The vehicle body 2 has a front axle frame 9 fixed to the lower portion of the engine. The front axle frame 9 includes a first side plate 9a arranged to the left, a second side plate 9b arranged to the right, and a front plate 9c connecting a front end of the first side plate 9a and a front end of the second side plate 9b.

The front axle frame 9 supports a front axle case 10. The front axle case 10 supports the axle of the front wheel 3F. In addition, the vehicle body 2 has a rear axle case 11 fixed to a rear portion of the transmission case 8. The rear axle case 11 supports the axle of the rear wheel 3R.

A front loader 12 is attached to the vehicle body 2. The front loader 12 is supported by a front portion of the vehicle body 2. The front loader 12 includes a first frame 13, a second frame 14, a boom 15, a bucket 16, a boom cylinder 17, and a bucket cylinder 18.

The first frame 13 has a first left frame 13L and a first right frame 13R. The first frame 13 is attached to a side portion of the vehicle body 2 and extends in the front-rear direction. The rear portion of the first frame 13 is attached to the rear axle case 11 of the vehicle body 2 with a bracket 19 by bolts or the like. A second frame 14 is attached to a front portion of the first frame 13.

The second frame 14 is attached to the first frame 13 and supports the boom 15. The second frame 14 has a second left frame 14L and a second right frame 14R. The second frame 14 has an attachment plate 14a, a support body 14b, a main frame 14c, and a side frame 14d.

The attachment plates 14a are attached to the left side and right side of the front axle frame 9 of the vehicle body 2, respectively. The support body 14b protrudes the vehicle outward direction from the attachment plate 14a. The main frame 14c extends upward from the end portions of the left and right support bodies 14b in the vehicle outward direction.

The lower portion of the main frame 14c is attached to the front portion of the first frame 13. The side frame 14d is attached to the main frame 14c. The side frame 14d extends upward from the main frame 14c. A pivot shaft 20 extending in the vehicle width direction is provided on an upper portion of the side frame 14d.

The boom 15 has a left boom 15L and a right boom 15R. The left boom 15L is supported by the second left frame 14L. The right boom 15R is supported by the second right frame 14R. The middle portion of the left boom 15L and the middle portion of the right boom 15R are connected to each other by a connector body 29.

The base end side of the boom 15 is supported swingably around a pivot shaft 20 provided on the second frame 14 (the side frame 14d). A pivot shaft 21 extending in the vehicle width direction is provided on the tip end side of the boom 15.

The boom cylinder 17 connects the side frame 14d and the boom 15. One end portion (a tip end portion) of the boom cylinder 17 is rotatably supported with a first lateral shaft 22 at a middle portion of the side frame 14d in the vertical direction.

The other end portion (a base end portion) of the boom cylinder 17 is rotatably supported with a second lateral shaft 23 at a middle portion of the boom 15 in the front-rear direction (in a longitudinal direction). The boom 15 swings upward around the pivot shaft 20 by the stretching of the boom cylinder 17, and swings downward around the pivot shaft 20 by the shortening of the boom cylinder 17.

The bucket 16 is supported so as to swing around the pivot shaft 21. The bucket cylinder 18 connects the bucket 16 and the boom 15. One end portion (a base end portion) of the bucket cylinder 18 is pivotally supported with a third lateral shaft 26 at a middle portion of the boom 15 in the front-rear direction (in the longitudinal direction). The other end portion (a tip end portion) of the bucket cylinder 18 is rotatably supported by the bucket 16 with a fourth lateral shaft 27 and the like through a link mechanism.

The bucket cylinder 18 operates the bucket 16. The bucket 16 performs the squeezing operation around the pivot shaft 21 with the bucket cylinder 18 stretched, and performs the dumping operation around the pivot shaft 21 with the bucket cylinder 18 shortened.

The boom cylinder 17 and the bucket cylinder 18 are controlled by a control valve (not shown in the drawings). The control valve is arranged inside a cover 24 attached to the first frame 13. The control valve is manually operated by an operation tool such as the operation lever 7.

<Front Guard>

Next, the front guard 30 attached to the tractor 1 will be described below.

As shown in FIG. 8 and FIG. 9, the front guard 30 is attached to the front portion of the vehicle body 2 of the tractor 1. The front guard 30 protects the front portion of the bonnet 25 of the tractor 1.

As shown in FIG. 1 to FIG. 4, the front guard 30 includes a lower frame 31 and an upper frame 41. The lower frame 31 is attached to the vehicle body 2 of the tractor 1. The upper frame 41 is attached to the lower frame 31.

The directions (the left, the right, and the like) described in the following description of the front guard 30 are directions under the state where the front guard 30 is attached to the vehicle body 2 (the state where the front guard 30 is in a standing posture to be described later).

Hereinafter, the lower frame 31 will be described with reference to FIG. 1 to FIG. 4.

The lower frame 31 has a first lower member 32L and a second lower member 32R. Hereinafter, the first lower member 32L and the second lower member 32R may be collectively referred to as a lower member 32.

The first lower member 32L and the second lower member 32R are attached to the front axle frame 9 of the vehicle body 2 described above.

The first lower member 32L is arranged on a first side (the left side) in front of the vehicle body 2. The second lower member 32R is arranged on a second side (the right side) in front of the vehicle body 2. The first lower member 32L is arranged such that one surface (the surface on the vehicle outward side) faces to the left, and the other surface (the surface on the vehicle inward side) faces to the right. The second lower member 32R is arranged such that one surface (the surface on the vehicle outward side) faces to the right, and the other surface (the surface on the vehicle inward side) faces to the left.

The first lower member 32L has a first base portion 33L and a first stretching portion 34L.

The first base portion 33L is attached to the first side plate 9a of the front axle frame 9. A plurality of first attachment holes 35L are formed in the first base portion 33L. The first base portion 33L is attached to a front portion of the left side of the first side plate 9a by inserting a bolt BL1 inserted into the first attachment hole 35L and screwing a nut to the bolt BL1 (refer to FIG. 5).

The first stretching portion 34L has a first lower stretching portion 34La and a first upper stretching portion 34Lb. The first lower stretching portion 34La extends obliquely upward and leftward from the front portion of the first base portion 33L. The first upper stretching portion 34Lb extends upward from the upper end of the first lower stretching portion 34La.

The first pivot shaft 55L is inserted through the first upper stretching portion 34Lb. The first pivot shaft 55L extends in the vehicle width direction. The first pivot shaft 55L is also inserted into a first stretching portion 42L of the upper frame 41 to be described later.

The second lower member 32R has a second base portion 33R and a second stretching portion 34R.

The second base portion 33R is attached to the second side plate 9b of the front axle frame 9. A plurality of second attachment holes 35R are formed in the second base portion 33R. The second base portion 33R is attached to the front portion of the right side of the second side plate 9b by inserting a bolt into the second attachment hole 35R and screwing a nut to the bolt.

The second stretching portion 34R has a second lower stretching portion 34Ra and a second upper stretching portion 34Rb. The second lower stretching portion 34Ra extends obliquely upward and rightward from the front portion of the second base portion 33R. The second upper stretching portion 34Rb extends upward from the upper end of the second lower stretching portion 34Ra.

The second pivot shaft 55R is inserted through the second upper stretching portion 34Rb. The second pivot shaft 55R extends in the vehicle width direction. The second pivot shaft 55R is also inserted into a second stretching portion 42R of the upper frame 41 to be described later.

Hereinafter, the first stretching portion 34L and the second stretching portion 34R may be collectively referred to as an stretching portion 34. In addition, the first pivot shaft 55L and the second pivot shaft 55R may be collectively referred to as a pivot shaft 55.

The upper frame 41 is attached to the lower frame 31 so as to be swingable around an axis extending in the vehicle width direction. In particular, the upper frame 41 is attached to the lower frame 31 so as to be swingable about the first pivot shaft 55L and the second pivot shaft 55R.

That is, the pivot shaft 55 supports the upper frame 41 so as to be swingable with respect to the lower frame 31.

As shown in FIG. 8 and FIG. 9, the upper frame 41 is arranged in front of the bonnet 25 of the tractor 1. Hereinafter, the upper frame 41 will be described with reference to FIG. 1 to FIG. 4. The upper frame 41 has a symmetrical (laterally symmetric) shape with respect to the center line in the vehicle width direction.

The upper frame 41 has the first stretching portion 42L, the second stretching portion 42R, and the connector portion 43. The first stretching portion 42L, the second stretching portion 42R, and the connector portion 43 are integrally formed of a mono member. In particular, the first stretching portion 42L, the second stretching portion 42R, and the connector portion 43 are formed by bending a single plate.

The first stretching portion 42L extends upward from the first side (the left side) of the first lower member 32L. The second stretching portion 42R extends upward from the second side (the right side) of the second lower member 32R. The connector portion 43 connects the upper end of the first stretching portion 42L and the upper end of the second stretching portion 42R.

The first stretching portion 42L has a first stretching lower portion 42La, a first inclining portion 42Lb, and a first stretching upper portion 42Lc. The first stretching lower portion 42La is attached to the first lower member 32L and extends upward.

The first inclining portion 42Lb is inclined and extends so as to shift to the first side (the left side) as it extends upward from the upper end of the first stretching lower portion 42La. The first stretching upper portion 42Lc extends upward from the upper end of the first inclining portion 42Lb to the connector portion 43 (in particular, to a first portion 43L to be described later).

The second stretching portion 42R has a second stretching lower portion 42Ra, a second inclining portion 42Rb, and a second stretching upper portion 42Rc. The second stretching lower portion 42Ra is attached to the second lower member 32R and extends upward.

The second inclining portion 42Rb is inclined and extends so as to shift to the second side (the right side) as it extends upward from the upper end of the second stretching lower portion 42Ra. The second stretching upper portion 42Rc extends upward from the upper end of the second inclining portion 42Rb to the connector portion 43 (in particular, to a second portion 43R to be described later).

Hereinafter, the first stretching portion 42L and the second stretching portion 42R may be collectively referred to as an stretching portion 42.

As shown in FIG. 1, the first stretching lower portion 42La and the second stretching lower portion 42Ra are arranged in parallel with each other. In addition, the first stretching upper portion 42Lb and the second stretching upper portion 42Rb are also arranged in parallel with each other. The clearance between the first stretching upper portion 42Lb and the second stretching upper portion 42Rb is larger than the clearance between the first stretching lower portion 42La and the second stretching lower portion 42Ra.

The clearance between the upper end of the first inclining portion 42Lb and the upper end of the second inclining portion 42Rb is larger than the clearance between the lower end of the first inclining portion 42Lb and the lower end of the second inclining portion 42Rb. The clearance between the first inclining portion 42Lb and the second inclining portion 42Rb gradually increases as is extends from below to above.

Figure 2:
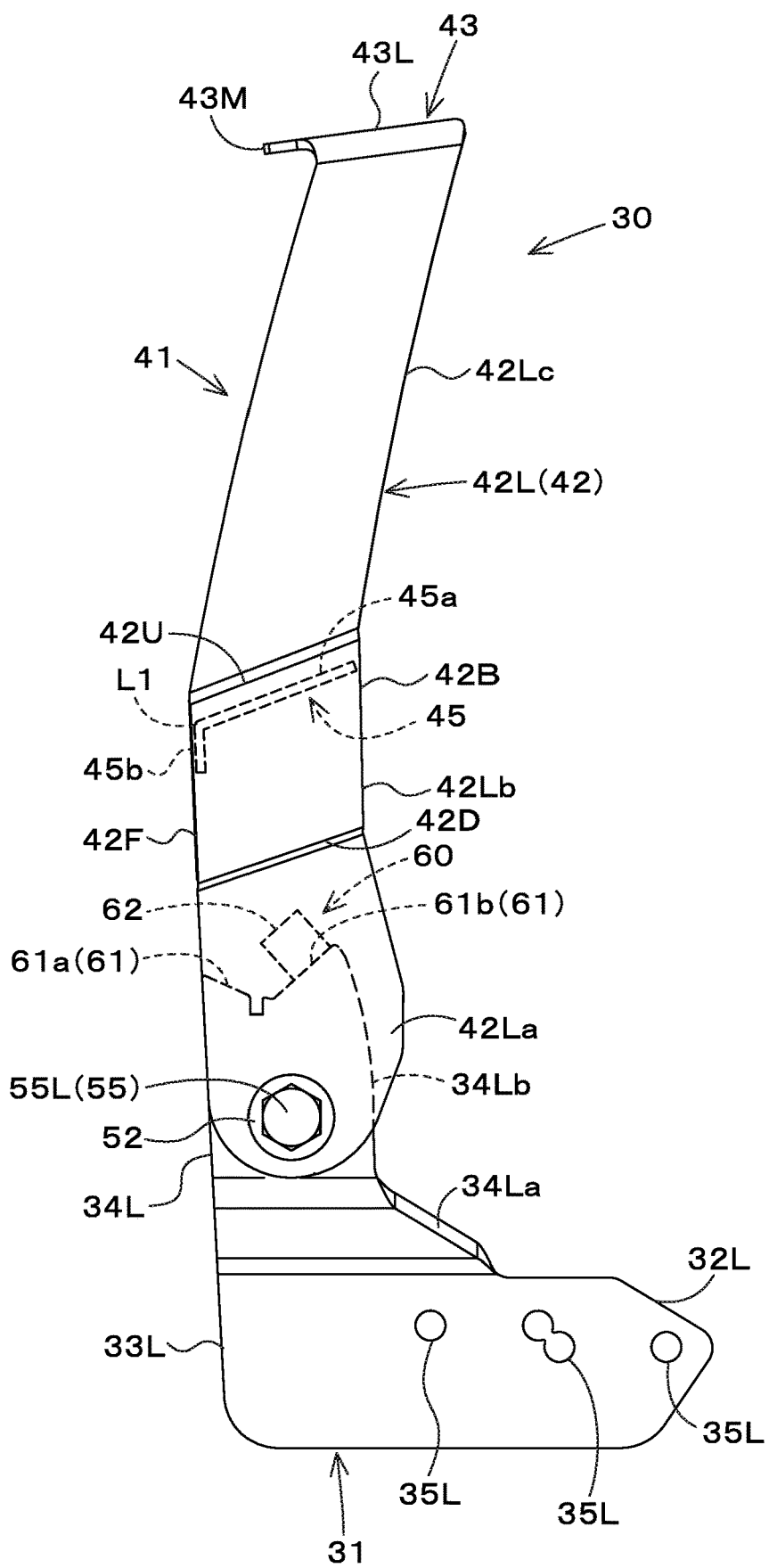
FIG. 2 is a side view of the front guard according to the embodiment.

As shown in FIG. 2, the side view shape of the first inclining portion 42Lb is a quadrilateral surrounded by an upper edge 42U, a lower edge 42D, a front edge 42F, and a rear edge 42B.

In particular, the side view shape of the first inclining portion 42Lb is a parallelogram. The upper edge 42U and the lower edge 42D are parallel to each other, and the front edge 42F and the rear edge 42B are parallel to each other. The upper edge 42U and the lower edge 42D are inclined so as to shift downward in a side view as it extends forward. The angle formed by the upper edge 42D and the front edge 42F is obtuse, the angle formed by the upper edge 42U and the rear edge 42B is acute, the angle formed by the lower edge 42D and the front edge 42F is acute, and the angle formed by the lower edge 42D and the rear edge 42B is obtuse.

The second inclining portion 42Rb is symmetrical to the first inclining portion 42Lb with respect to the center line in the vehicle width direction. Thus, the side view shape of the second inclining portion 42Rb is a square shape (in particular, a parallelogram) surrounded by the upper edge, the lower edge, the front edge, and the rear edge, similarly to the first inclining portion 42Lb.

In addition, the upper edge and the lower edge of the second inclining portion 42Rb are parallel to each other, the front edge and the rear edge of the second inclining portion 42Rb are parallel to each other, and the upper edge and the lower edge are inclined so as to shift downward as it extends forward in a side view. The angle formed by the upper edge and the front edge is obtuse, the angle formed by the upper edge and the rear edge is acute, the angle formed by the lower edge and the front edge is acute, and the angle formed by the lower edge and the rear edge is obtuse.

The connector portion 43 has a first portion 43L, a second portion 43R, and an middle portion 43M.

The first portion 43L is a portion provided on the first side (the left side) of the connector portion 43. The first portion 43L is connected to the first stretching portion 42L. The first portion 43L extends from the upper end of the first stretching portion 42L to the second side (the right side).

The second portion 43R is a portion arranged on the second side (the right side) of the connector portion 43. The second portion 43R is connected to the second stretching portion 42R. The second portion 43R extends from the upper end of the second stretching portion 42R to the first side (the left side).

As shown in FIG. 1, the boundary between the first portion 43L and the first stretching portion 42L and the boundary between the second portion 43R and the second stretching portion 42R are respectively formed in a round shape (an arc shape). In this manner, the stress concentration hardly occurs at the boundary portions, and the strength of the upper frame 41 can be improved.

In addition, when another object collides with the upper end of the front guard 30, it is possible to prevent the other object from being damaged. The shape of the boundary between the first portion 43L and the first stretching portion 42L (a round shape) and the shape of the boundary portion between the second portion 43R and the second stretching portion 42R (a round shape) are symmetrical with respect to the center line in the vehicle width direction.

The middle portion 43M is a portion located between the first portion 43L and the second portion 43R. The middle portion 43M connects the first portion 43L and the second portion 43R.

Figure 3:
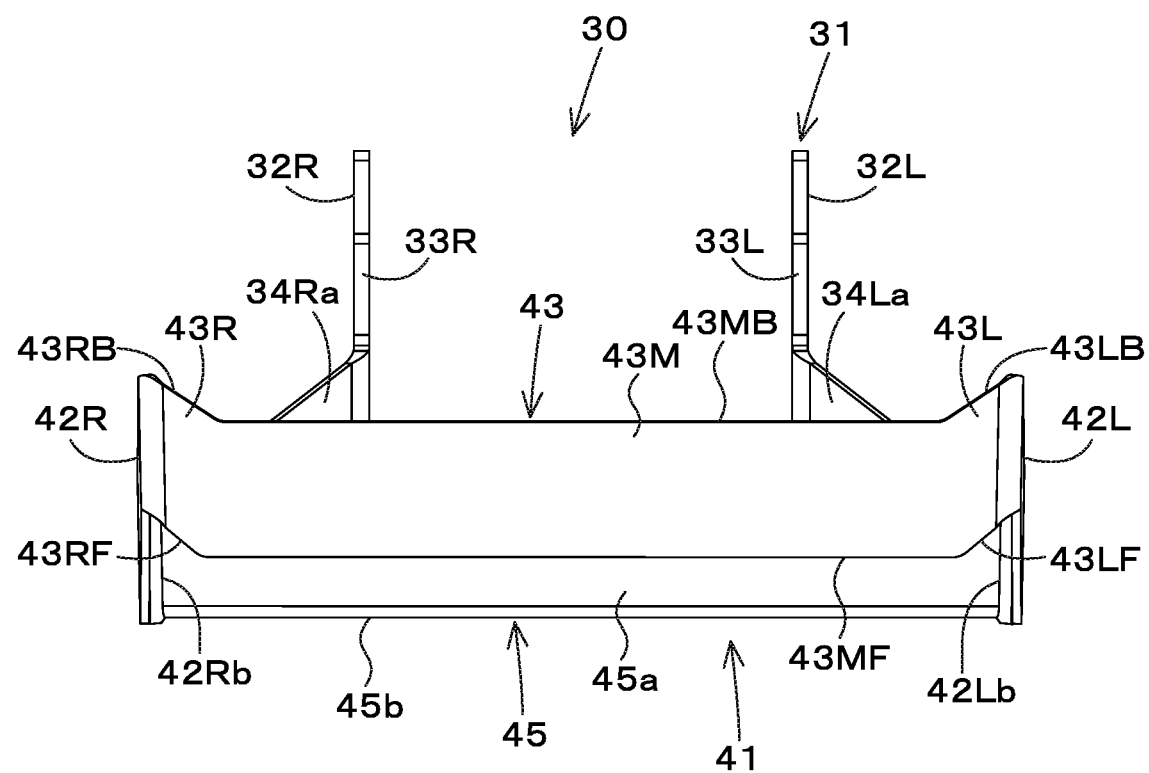
FIG. 3 is a plan view of the front guard according to the embodiment.

As shown in FIG. 3, the first portion 43L shifts forward from the first stretching portion 42L side toward the middle portion 43M side. The second portion 43R shifts forward from the second stretching portion 42R side toward the middle portion 43M side.

The middle portion 43M extends in the vehicle width direction and connects the first portion 43L and the second portion 43R. Each of the first portion 43L, the second portion 43R, and the middle portion 43M is a straight portion that is not curved in a plan view (in a top view).

The front edge 43LF and the rear edge 43LB of the first portion 43L are parallel to each other, and are shifted forward as it extends toward the second side (the middle portion 43M side).

The front edge 43LF and the rear edge 43LB have the same length. In a plan view (a top view), the angle formed by the front edge 43LF and the first stretching portion 42L and the angle formed by the rear edge 43LB and the first stretching portion 42L are the same, and both of the angles are acute. The plan view shape of the first portion 43L is a parallelogram.

The front edge 43RF and the rear edge 43RB of the second portion 43R are parallel to each other, and are shifted forward as it extends toward the first side (the middle portion 43M side).

The front edge 43RF and the rear edge 43RB have the same length. In a plan view (top view), the angle formed by the front edge 43RF and the second stretching portion 42R and the angle formed by the rear edge 43RB and the second stretching portion 42R are the same, and both of the angles are acute. The plan view shape of the second portion 43R is a parallelogram.

The front edge 43MF of the middle portion 43M linearly connects the front edge 43LF of the first portion 43L and the front edge 43RF of the second portion 43R. The rear edge 43MB of the middle portion 43M linearly connects the rear edge 43LR of the first portion 43L and the rear edge 43RB of the second portion 43R.

The length of the middle portion 43M in the vehicle width direction is longer than the sum of the lengths of the first portion 43L and the second portion 43R in the vehicle width direction. The length of middle portion 43M in the vehicle width direction is preferably as at least three times, more preferably at least four times, as the sum of the lengths of first portion 43L and second portion 43R in the vehicle width direction.

The first stretching portion 42L is attached to the first lower member 32L so as to be swingable about an axis extending in the vehicle width direction. In particular, the first stretching lower portion 42La of the first stretching portion 42L is attached to the first lower member 32L so as to be swingable about the first pivot shaft 55L. The first pivot shaft 55L is inserted through the first stretching lower portion 42La and the first stretching upper portion 34Lb.

The second stretching portion 42R is attached to the second lower member 32R so as to be swingable about an axis extending in the vehicle width direction. In particular, the second stretching lower portion 42Ra of the second stretching portion 42R is attached to the second lower member 32R so as to be swingable about the second pivot shaft 55R. The second pivot shaft 55R is inserted through the second stretching lower portion 42Ra and the second stretching upper portion 34Rb.

By swinging the first stretching portion 42L about the first pivot shaft 55L with respect to the first lower member 3 and by swinging the second stretching portion 42R around the second pivot shaft 55R with respect to the second lower member 32R, the upper frame 41 swings with respect to the lower frame 31.

Figure 5:
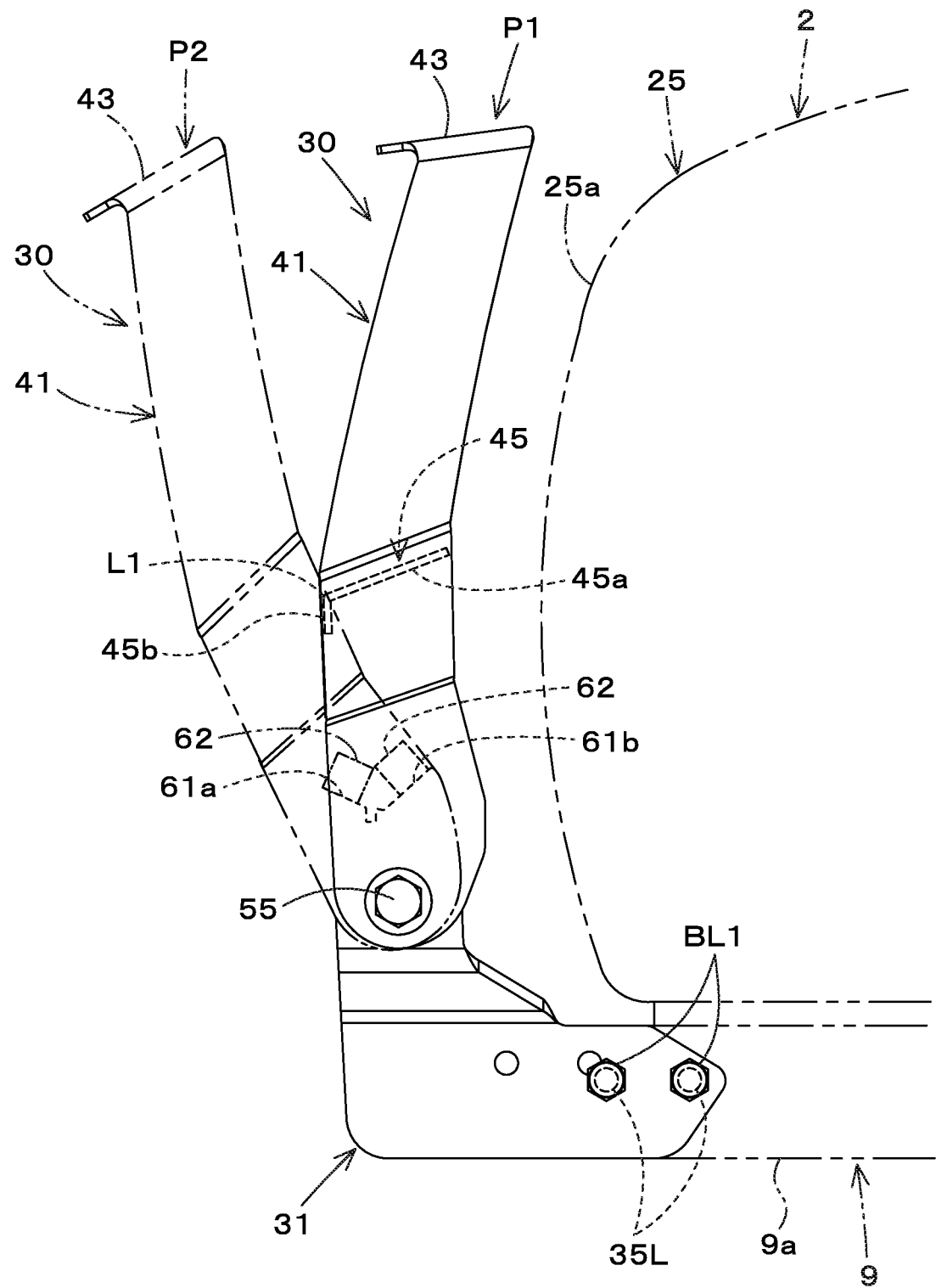
FIG. 5 is a side view explaining swinging of the front guard according to the embodiment.

As shown in FIG. 5, the upper frame 41 swings with respect to the lower frame 31 and thereby change the posture between a standing posture (see a solid line) and a forward-leaning posture (see a virtual line). When the upper frame 41 is in the standing posture, the upper frame 41 is located at a position close to the front surface 25a of the bonnet 25 (a guard position P1).

When the upper frame 41 is in the forward-leaning posture, the upper frame 41 is located at a position separating forward from the front surface 25a of the bonnet 25 (a retracing position P2).

As shown in FIG. 1 to FIG. 4, the upper frame 41 has a connector member 45.

The connector member 45 connects the first stretching portion 42L and the second stretching portion 42R underneath the connector portion 43. In the present embodiment, the connector member 45 is formed of an L-shaped plate material bent along a bending line L1 extending in the vehicle width direction.

However, the connector member 45 is not limited to the L-shaped plate, and may be formed of a C-shaped plate curved along a line extending in the vehicle width direction, for example.

In the present embodiment, the connector member 45 has a first plate portion 45a and a second plate portion 45b provided on both sides of the bending line L1 interposed therebetween. The first plate portion 45a is located above the bending line L1. The second plate portion 45b is located below the bending line L1. The angle (a bending angle) formed by the first plate portion 45a and the second plate portion 45b is a right angle or an obtuse angle close to a right angle.

As shown in FIG. 2, when the upper frame 41 is in the standing posture, the first plate portion 45a is inclined so as to shift downward as it extends forward. The first plate portion 45a is arranged respectively in parallel with the upper edge 42U and the lower edge 42B of the first inclining portion 42Lb and with the upper edge and the lower edge of the second inclining portion 42Rb.

The second plate portion 45b extends downward from the front edge of the first plate portion 45a. The front surface of the second plate portion 45b is located at a position close to the front edge 42F of the first inclining portion 42Lb and the second inclining portion 42Rb, and is arranged in parallel with the front edge 42F.

In addition, as shown in FIG. 2, when the upper frame 41 is in the standing posture, the connector portion 43 is inclined so as to shift downward as it extends forward. The front edge of the middle portion 43M, which is the front edge of the connector portion 43, protrudes forward from the front edge of the upper end of the stretching portion 42.

As shown in FIG. 3, the connector member 45 is located forward of the connector portion 43 in a plan view (in a top view) under the state where the front guard 30 in the standing posture.

In particular, the front edge of the connector member 45 is located forward of the front edge of the connector portion 43, and the rear edge of the connector member 45 is located forward of the rear edge of the connector portion 43. In addition, the rear portion of the connector member 45 and the front portion of the connecting portion 43 overlap each other over the entire lengths in the vehicle width direction.

As shown in FIG. 5, the rear edge of the upper frame 41 is bent so as to be close to the front surface of the bonnet 25 when the upper frame 41 is located at the guard position P1.

In particular, when the upper frame 41 is located at the guard position P1, the rear edges of the first stretching portion 42L and the second stretching portion 42R are bent so as to be close to the front surface 25a of the bonnet 25 in a side view.

Figure 4:
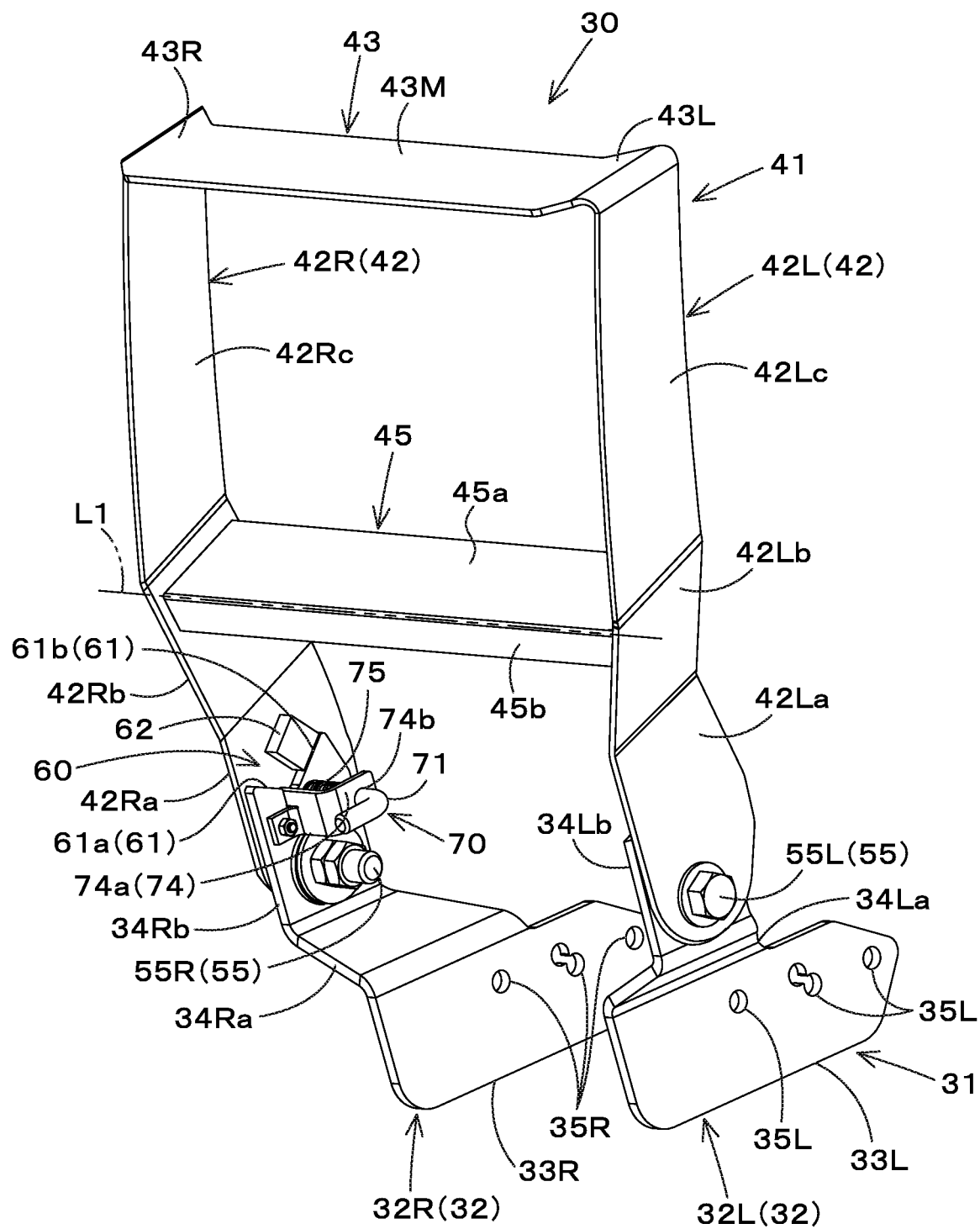
FIG. 4 is a perspective view of the front guard according to the embodiment.

As shown in FIG. 1, FIG. 2, and FIG. 4, the pivot shafts 55 (the first pivot shaft 55L and the second pivot shaft 55R) are constituted of bolts with heads, and penetrates the upper frame 41 and the lower frame 31 (in particular, the first stretching lower portion 42La and the first upper stretching portion 34Lb, and the second stretching lower portion 42Ra and the second upper stretching portion 34Rb) from the vehicle outward side toward the vehicle inward side.

Figure 7:
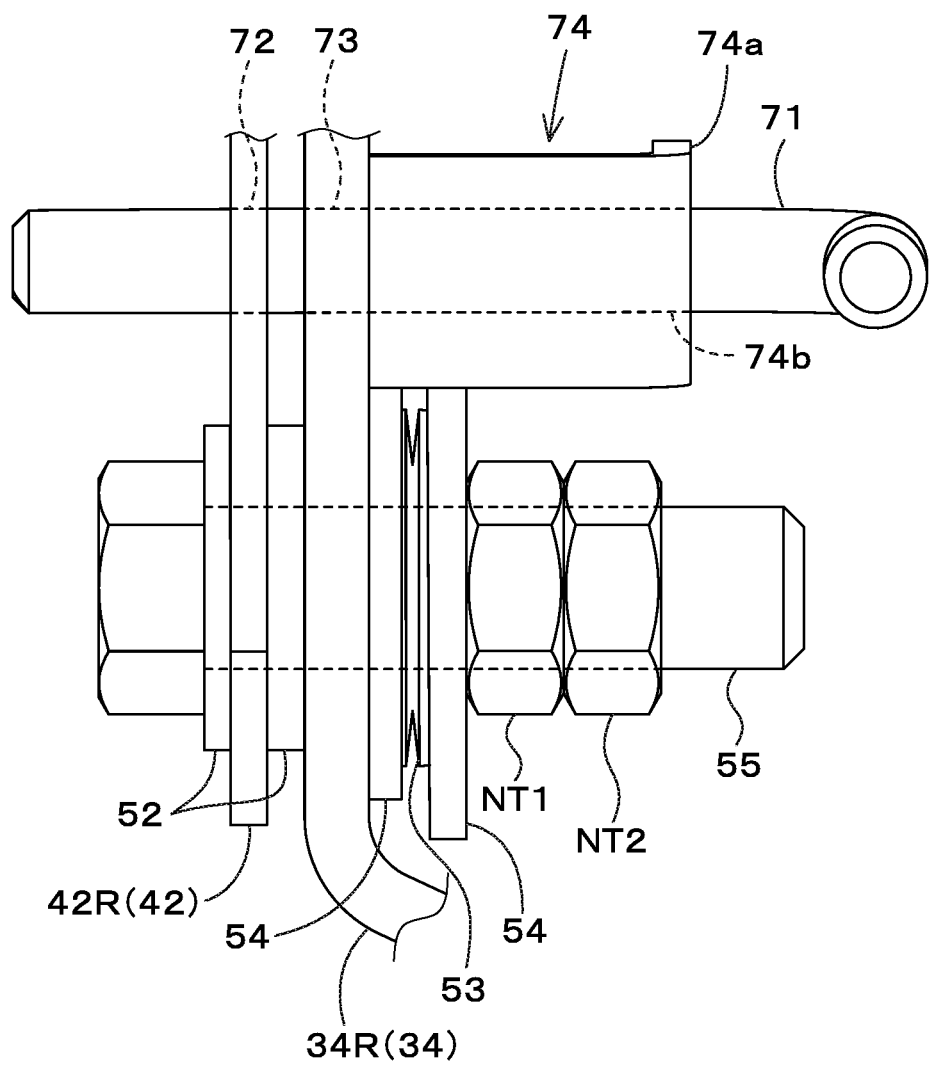
FIG. 7 is a view illustrating a locking mechanism according to the embodiment.

As shown in FIG. 7, the pivot shaft 55 penetrates through a pair of first flat washers 52, a disc spring washer 53, and a pair of second flat washers 54. The pair of first flat washers 52 are arranged on both sides of the stretching portion 42 interposed therebetween. The disc spring washer 53 is arranged on the vehicle inward side of the stretching portion 34. The pair of second flat washers 54 are arranged on both side of the disc spring washer 53 interposed therebetween.

A tightening nut NT1 and a lock nut NT2 are screwed to the screw portion of the pivot shaft 55. The fastening nut NT1 is in contact with the second flat washer 54 from the vehicle inward side.

The posture of the upper frame 41 with respect to the lower frame 31 can be fixed by tightening the tightening nut NT1. By loosening the fastening nut NT1, the upper frame 41 can be swung with respect to the lower frame 31, and thereby the posture of the upper frame 41 can be changed.

As shown in FIG. 1, FIG. 2, and FIG. 4, the front guard 30 has a regulator mechanism 60 that regulates a swing range of the upper frame 41 with respect to the lower frame 31. The regulator mechanism 60 regulates the swing range of the upper frame 41 to a range between the guard position P1 and the retracting position P2.

The regulator mechanism 60 is provided on each of the left portion and the right portion of the front guard 30. As shown in FIG. 2 and FIG. 4, the regulator mechanism 60 has a regulator portion 61 and a stopper plate 62.

The regulator portion 61 is formed on the upper surface of the lower member 32. The regulator portion 61 has a first regulating surface 61a and a second regulating surface 61b. The first regulating surface 61a is located on the front side of the upper surface of the lower member 32.

Figure 6:
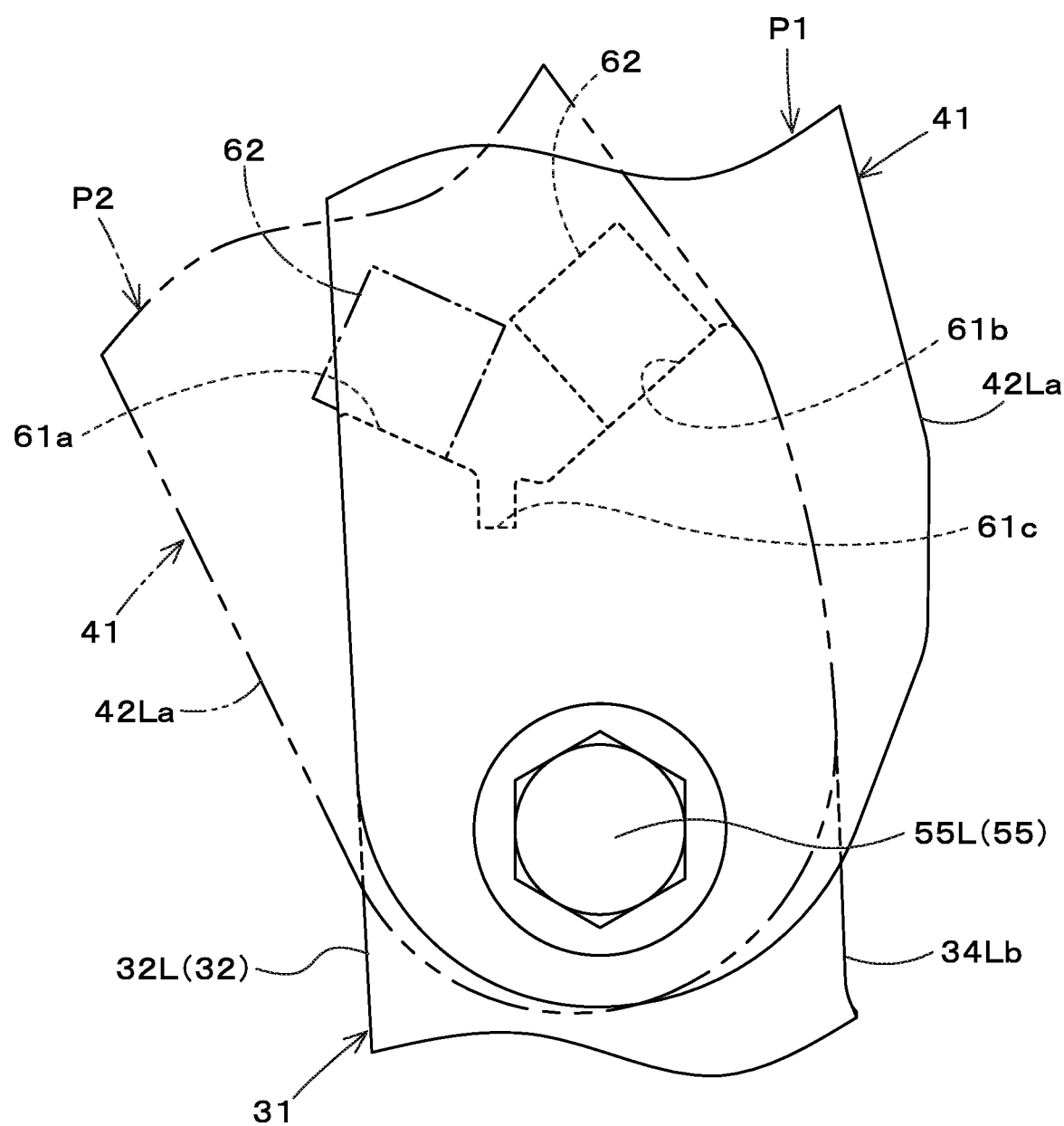
FIG. 6 is a view illustrating a restrictor mechanism according to the embodiment.

The second regulating surface 61b is located on the rear portion of the upper surface of the lower member 32. As shown in FIG. 6, the first regulating surface 61a and the second regulating surface 61b are arranged in a substantially V-formation in a side view with the concave portion 61c interposed therebetween.

The first regulating surface 61a is an inclining surface that extends forward and upward. The second regulating surface 61b is an inclining surface that extends rearward and upward.

The stopper plate 62 is a quadrangle plate in a side view. The stopper plate 62 is fixed, on the vehicle inward side, to the surfaces of the first stretching lower portion 42La and the second stretching lower portion 42Ra.

As shown by the solid line in FIG. 6, when the upper frame 41 is located at the guard position P1, the stopper plate 62 (shown by a hidden line (a broken line)) comes into contact with the second regulating surface 61b of the regulator portion 61. In this manner, the swinging of the upper frame 41 backward from the guard position P1 is restricted.

As shown by the imaginary line in FIG. 6, when the upper frame 41 is swung from the guard position P1 to the retracting position P2, the stopper plate 62 comes into contact with the first regulating surface 61a of the regulator portion 61. In this manner, the swinging of the upper frame 41 forward from the retracting position P2 is restricted.

As shown in FIG. 1, FIG. 4, FIG. 7 and the like, the front guard 30 has a lock mechanism 70 configured to fix the upper frame 41 at the guard position. The lock mechanism 70 has a lock pin 71, a lock hole 72, a pin support hole 73, a pin support member 74, and an biasing spring 75.

The lock hole 72 penetrates the stretching portion 42 of the upper frame 41 (in particular, the second stretching lower portion 42Ra). The pin support hole 73 penetrates the stretching portion 34 of the lower frame 31 (in particular, the second upper stretching portion 34Rb).

The pin support member 74 is fixed to an inner surface (a surface on the vehicle inward side) of the first upper stretching portion 34Lb of the lower frame 42. The pin support member 74 has an outer plate portion 74a that is arranged at a clearance from the inner surface of the first upper stretching portion 34Lb.

A through hole 74b is formed in the outer plate portion 74a. The through hole 74b is arranged on the same axis as an axis of the pin support hole 73. The lock pin 71 is inserted into the through hole 74b and the pin support hole 73 from the vehicle inward side.

When the upper frame 41 is located at the guard position P1, the lock hole 72 and the pin support hole 73 overlap each other. Under the state, the swinging of the upper frame 41 is restricted when the lock pin 71 is inserted so as to penetrate the through hole 74*b*, the pin support hole 73, and the lock hole 72, and the upper frame 41, and thereby the upper frame 41 is fixed (locked) at the guard position P1.

When the lock pin 71 is pulled out of the lock hole 72, the swinging of the upper frame 41 is allowed, so that the upper frame 41 can be located to the retracting position P2.

The biasing spring 75 (see FIG. 4) presses the lock pin 71 toward the vehicle outward side. In this manner, when the lock pin 71 is to be pulled out of the lock hole 72, the pulling out is necessary to be performed against the biasing force of the biasing spring 75, so that it is possible to prevent the lock pin 71 from being pulled out unexpectedly.

According to the front guard 30 of the embodiment described above, the following effects can be provided.

The front guard 30 is a front guard being configured to be attached to a front portion of the vehicle body of the working vehicle 1, comprises: the lower frame 31 to be attached to the vehicle body 2; and the upper frame 41 attached to the lower frame 31 swingably around an axis extending in a vehicle width direction to be arranged in front of the bonnet 25 of the working vehicle 1, and configured to be swung to change a posture between a standing posture and a forward-leaning posture with respect to the lower frame 31. The lower frame 31 has: the first lower member 32L to be arranged to the first side in front of the vehicle body 2; and the second lower member 32R to be arranged to the second side in front of the vehicle body 2. The upper frame 41 has: the first stretching portion 42L extending upward from the first side of the first lower member 32L; the second stretching portion 42R extending upward from the second side of the second lower member 32R; and the connector portion 43 connecting between an upper end of the first stretching portion 42L and an upper end of the second stretching portion 42R. The connector portion 43 has: the first portion 43L to be connected to the first stretching portion 42L; the second portion 43R to be connected to the second stretching portion 42R; and the middle portion 43M connecting the first portion 43L and the second portion 43R. The first portion 43L shifts forward as extending from the first stretching portion 42L side to the middle portion 43M side. The second portion 43R shifts forward as extending from the second stretching portion 42R side to the middle portion 43M side. The middle portion 43M extends in the vehicle width direction to connect the first portion 43L and the second portion 43R.

According to the configuration, the connector portion 43 connects the upper end of the first stretching portion 42L and the upper end of the second stretching portion 42R, and the middle portion 43M protrudes forward from the first portion 43L and the second portion 43R of the connector portion 43. In this manner, the vehicle body 2 can be reliably protected from not only the impact applied from the front but also the impact applied from the upper front.

In addition, since the first portion 43L and the second portion 43R extend diagonally forward and the middle portion 43M extends in the vehicle width direction, the middle portion 43M protruding forward has a structure extending in the vehicle width direction, and thereby the middle portion 43M reliably receives the impact applied from the upper front.

In addition, the connector portion 43 inclines shifting downward as extending forward when the upper frame 41 has the standing posture.

According to the configuration, the connector portion 43 is capable of reliably receiving the impact applied obliquely from the upper front, and thus is capable of effectively protecting the vehicle body 2 against the external impact.

In addition, the front guard 30 comprises the connector member 45 connecting the first stretching portion 42L and the second stretching portion 42R below the connector portion 43. The connector member 45 has the first plate portion 45*a* inclining shifting downward as extending forward when the upper frame 41 has the standing posture.

According to the configuration, the first plate portion 45*a* is also capable of receiving the impact applied obliquely from the upper front, and thus is capable of effectively protecting the vehicle body 2 against the external impact.

In addition, the connector member 45 has the second plate portion 45*b* extending downward from a front edge of the first plate portion 45*a* when the upper frame 41 has the standing posture.

According to the configuration, the second plate portion 45*b* is capable of receiving the impact applied from the lower front, and thus is capable of effectively protecting the vehicle body 2 against the external impact.

In addition, the connector member 45 is constituted of a plate member bent on a bending line extending in the vehicle width direction to have an L-shape. The first plate member 45*a* is positioned above the bending line L1. The second plate member 45*b* is positioned below the bending line L1.

According to the configuration, since the first stretching portion 42L and the second stretching portion 42R are connected by the L-shaped connector member 45, the connection between the connector member 45 and the first stretching portion 42L and the second stretching portion 42R can be strengthened, and the rigidity of the connector member 45 is increased, so that the strength of the front guard 30 can be improved.

In addition, the first stretching portion 42L has: the first stretching lower portion 42La to be attached to the first lower member 32L; the first inclining portion 42Lb inclining shifting toward the first side as extending upward from an upper end of the first stretching lower portion 42La; and the first stretching upper portion 42La extending from an upper end of the first inclining portion 42Lb to the first portion. The second stretching portion 42R has: the second stretching lower portion 42Ra to be attached to the second lower member 32R; the second inclining portion 42Rb inclining shifting toward the second side as extending upward from an upper end of the second stretching lower portion 42Ra; and the second stretching upper portion 42Rc extending from an upper end of the second inclining portion 42Rb to the second portion. The connector member 45 connects the first inclining portion 42Lb and the second inclining portion 42Rb.

According to the configuration, the lateral width of the upper frame 41 (the length in the vehicle width direction) can be changed at the first inclining portion 42Lb and the second inclining portion 42Rb and thereby expanded. Thus, the vehicle body 2 can be effectively protected against the external impact obliquely applied from the upper front.

In addition, since the connector member 45 connects the first inclining portion 42Lb and the second inclining portion 42Rb, the portion where the width of the upper frame 41 is changed (expanded) is reinforced by the connector member 45, and thereby the strength of the upper frame 41 is improved.

The connector member 45 is positioned forward from the connector portion 43 in a top view when the upper frame 41 has the standing posture. The first stretching portion 42L, the second stretching portion 42R, and the connector portion 43 are integrally formed of a single member.

According to the configuration, the first stretching portion 42L, the second stretching portion 42R, and the connector portion 43 are integrally formed without a connector portion such as a welded portion. Thus, it is possible to avoid occurrence of the stress concentration at the connection portion, and thereby the strength of the upper frame 41 is improved. In addition, the number of parts of the upper frame 41 and the number of processing steps of the upper frame 41 can be reduced.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A front guard for a working vehicle, the front guard being configured to be attached to a front portion of a vehicle body of the working vehicle, comprising:
    a lower frame to be attached to the vehicle body; and
    an upper frame attached to the lower frame swingably around an axis extending in a vehicle width direction to be arranged in front of a bonnet of the working vehicle, and configured to be swung with respect to the lower frame to change a posture between a standing posture and a forward-leaning posture,
    wherein the lower frame has:
        a first lower member to be arranged to a first side in front of the vehicle body; and
        a second lower member to be arranged to a second side in front of the vehicle body,
    wherein the upper frame has:
        a first stretching portion extending upward from the first side of the first lower member;
        a second stretching portion extending upward from the second side of the second lower member;
        a connector portion connecting between an upper end of the first stretching portion and an upper end of the second stretching portion; and
        a connector member connecting the first stretching portion and the second stretching portion below the connector portion,
    wherein the connector portion has:
        a first portion connected to the first stretching portion;
        a second portion connected to the second stretching portion; and
        a middle portion connecting the first portion and the second portion,
    wherein the first portion shifts forward as extending from the first stretching portion side to the middle portion side,
    wherein the second portion shifts forward as extending from the second stretching portion side to the middle portion side,
    wherein the middle portion extends in the vehicle width direction to connect the first portion and the second portion,
    and wherein the connector member has a first plate portion inclining shifting downward as extending forward when the upper frame has the standing posture.

2. The front guard according to claim 1,
    wherein the connector portion inclines shifting downward as extending forward when the upper frame has the standing posture.

3. The front guard according to claim 1,
    wherein the connector has
        a second plate portion extending downward from a front edge of the first plate portion when the upper frame has the standing posture.

4. The front guard according to claim 3,
    wherein the connector member is constituted of a plate member bent on a bending line extending in the vehicle width direction to have an L-shape,
    wherein the first plate member is positioned above the bending line,
    and wherein the second plate member is positioned below the bending line.

5. The front guard according to claim 1,
    wherein the first stretching portion has:
        a first stretching lower portion attached to the first lower member;
        a first inclining portion inclining shifting toward the first side as extending upward from an upper end of the first stretching lower portion; and
        a first stretching upper portion extending from an upper end of the first inclining portion to the first portion,
    wherein the second stretching portion has:
        a second stretching lower portion attached to the second lower member;
        a second inclining portion inclining shifting toward the second side as extending upward from an upper end of the second stretching lower portion; and
        a second stretching upper portion extending from an upper end of the second inclining portion to the second portion,
    and wherein the connector member connects the first inclining portion and the second inclining portion.

6. The front guard according to claim 1,
    wherein the connector member is positioned forward from the connector portion in a top view when the upper frame has the standing posture.

7. The front guard according to claim 1,
    wherein the first stretching portion, the second stretching portion, and the connector portion are integrally formed of a single member.

* * * * *